United States Patent [19]

Wakameda et al.

[11] Patent Number: 5,415,886
[45] Date of Patent: May 16, 1995

[54] METHOD FOR PROCESSING ALASKA POLLACK ROE

[75] Inventors: Atsushi Wakameda; Shinichiro Nishimoto, both of Ibaraki; Kiyoshi Aihara; Shunichi Tsunematsu, both of Tokyo; Fumio Hirata, Ibaraki, all of Japan

[73] Assignee: Maruha Corporation, Tokyo, Japan

[21] Appl. No.: 59,990

[22] Filed: May 12, 1993

[30] Foreign Application Priority Data

May 27, 1992 [JP] Japan .................................. 4-135155

[51] Int. Cl.⁶ .............................................. A23L 1/328
[52] U.S. Cl. ...................................... 426/643; 426/519
[58] Field of Search ........................ 426/238, 643, 519

[56] References Cited

U.S. PATENT DOCUMENTS 4,399,161  8/1983  Nakamura et al. ............. 426/643 X
4,477,476  10/1984  Kagawa et al. ................. 426/643 X

FOREIGN PATENT DOCUMENTS 59-6862    1/1984  Japan .................................. 426/643
61-271966  12/1986 Japan .................................. 426/643

*Primary Examiner*—Arthur L. Corbin
*Attorney, Agent, or Firm*—Young & Thompson

[57] ABSTRACT

A method for processing Alaska pollack roe according to the present invention comprises salting the Alaska pollack roe while vibrating said roe.

2 Claims, 2 Drawing Sheets

METHOD FOR PROCESSING ALASKA POLLACK ROE

BACKGROUND OF THE INVENTION

1. Field of the Invention

This invention relates to a method for producing food, more particularly, to a novel method for processing Alaska pollack roe in the production of fish roe products, in particular, salted Alaska pollack roe and karashi-mentaiko (Alaska pollack roe pickled in red pepper sauce).

2. Description of the Prior Art

In general, the qualities of Alaska-pollack roe (roe qualities) widely vary depending on, for example, the season, area and method of fishing, the post-fishing storage conditions and the method for roe collection. For example, the roe of Alaska pollack fish caught in the spawning season near the spawning ground attains a high maturity and has a large ovary. In contrast, the roe not yet reaching the spawning season has a small ovary and shows immature development. Further, the roe qualities vary depending on the post-fishing storage conditions. When pressure or impact is applied to a fish body, for example, the adhesion of bile pigments to the ovary and the infiltration of hemachromes from the intestinal tracts are liable to occur. When a fish body is overcooled, it is sometimes observed that some part or the whole of the ovary is frozen.

Furthermore, it is sometimes observed that an inappropriate roe collection method or an unsuitable treatment of roe after collection would cause cutting in the ovary, breakage of the ovarian membrane or roe granules or contamination of roe with the internals other than the ovary. In addition, a wide variety of materials, which are liable to undergo changes, are employed, since the size of the ovary varies depending on the age and body size of fish. In other words, the feedstock materials vary widely.

Accordingly, there is a difficulty that feedstock materials should be severely selected and, at the same time, a method for processing the material should be modified depending on the qualities of the roe thus selected. It is highly difficult to establish definite standard conditions for a method for producing an Alaska pollack roe product. Under the existing circumstances, therefore, Alaska pollack roe products are produced in accordance with the conditions of feedstock materials depending on the perception and experiences of the persons in charge.

Salting is the most important step in the production of an Alaska pollack roe product. In the step of salting, water is added to roe together with, for example, salt (sodium chloride), seasonings and colorants and mixed. In this step, there has been used a rotary cask whereby the roe and additives contained therein are well mixed by rotating, thus promoting the migration (penetration) of the salt, seasonings and colorants into the roe. However, the rate of migration of substances into the roe varies depending on the type and concentration of the substances. Thus, uniform migration into the center of the roe cannot be sufficiently achieved. In addition, as discussed above, the qualities of the product widely vary depending on the conditions of the roe employed as the feedstock material, which brings about a serious problem in the production of Alaska pollack roe products.

SUMMARY OF THE INVENTION

Accordingly, it is an object of the present invention to provide a method for processing Alaska pollack roe whereby salt, seasonings and colorants can uniformly migrate into the center of roe in the step of salting regardless of the conditions of the roe employed as the feedstock material and thus the qualities of Alaska pollack roe products can be uniformed.

As the results of extensive studies, the present inventors have found out that the above-mentioned object can be achieved by salting roe while vibrating said roe, since a product being excellent and uniform in qualities can be obtained thereby.

The present invention, which has been completed based on this finding, provides a method for processing Alaska pollack roe characterized by salting Alaska pollack roe while vibrating said roe.

DETAILED DESCRIPTION OF THE INVENTION

Figure 1A:
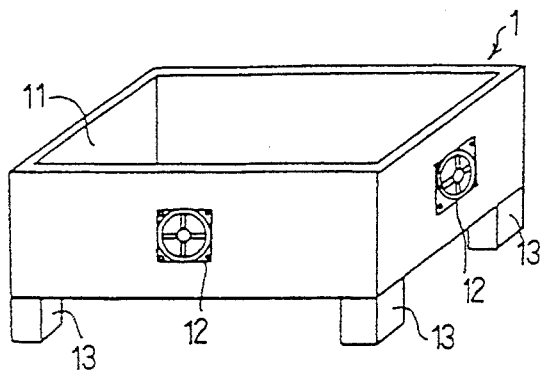
FIG. 1 (a) is a perspective view showing one example of the salting and maturing container of the roe used in the present invention, FIG. 1 (b) is its plan view, FIG. 1 (c) is its side view and FIG. 1 (d) is its bottom view.
Figure 1B:
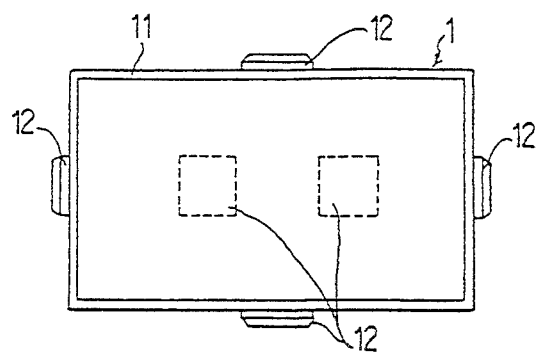
Figure 1C:
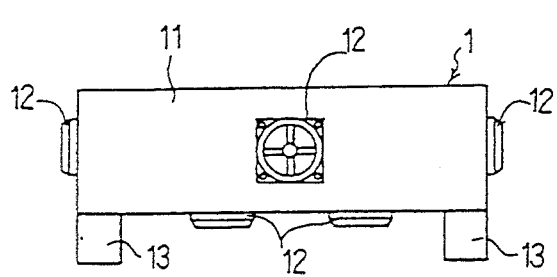
Figure 1D:
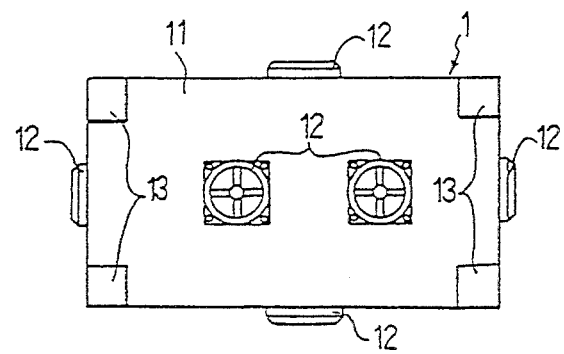

Although it is preferable to quickly treat the roe to be used as the feedstock material after fishing, roe taken out of Alaska pollack fish, which has been stored at a low temperature for 1 or 2 days or longer after fishing, is also usable. Furthermore, the processing method of the present invention may be effectively applicable to a feedstock material which has been frozen and then thawed.

Although the roe qualities are not particularly restricted, it is advantageous to use roe which is uniform in size, weight and maturity, similar to each other in surface color and flawless in the ovarian membrane. When the ovarian membrane suffers from flaws, roe granules flow out of the flaws, thus lowering the yield. After weighing out a given amount of roe, the roe is transferred into a container for salting (salting container) to effect salting. In the step of salting, additives, which have been previously weighed, are added to the salting container and then thoroughly mixed with the roe. Then the additives and the roe thus mixed together are vibrated. The conditions for the vibration will be described hereinafter.

The additives to be used here are not restricted, so long as they are selected from those which have been generally used in salting Alaska pollack roe. For example, substances which are suitable as common food additives and those which do not affect the qualities of the product may be used therefor.

Common salt (sodium chloride), which should be used as an essential additive, may be used at a concentration of from 5 to 20 parts by weight pare 100 parts by weight of the roe. The optimum concentration of the common salt may be appropriately varied depending on, for example, the roe and the amount of the water to be added. Alternately, part of the common salt may be replaced with a monovalent neutral inorganic salt such as KCl in compliance with the demand for diversified products.

An important point in the processing method according to the present invention resides in that the combination of the additives should be selected in such a manner as to give a salt content of the salted product of 2.5% or more and a water content thereof of 59% or more. The term "salt content" as used herein may refer to the concentration of common salt (NaCl) calculated either in terms of mainly $Na^+$ ions or in terms of $Cl^-$ ions. When the salt content of the salted product is less than 2.5% or the water content thereof is less than 59%, the qualities of the product such as texture are extremely deteriorated. The forms of the additives are not particularly restricted and any of solid (powdery) additives and liquid ones are usable, though it is preferable that these additives are homogeneously dissolved when mixed with the roe.

In the above-mentioned addition step, the temperature of the roe may be from 0° to 35° C., preferably from 5° to 25° C. A roe temperature lower than 0° C. is not preferable, since the roe is sometimes frozen in this case. On the other hand, a roe temperature exceeding 35° C. is not preferable from the viewpoint of sanitation, since bacteria would be liable to grow in this case.

Although the temperature of the additives in the addition step is not particularly restricted, a temperature of 70° C. or lower is preferable. When the temperature of the additives exceeds 70° C., proteins existing on the surface of the roe undergo denaturation, which deteriorates the qualities of the obtained product.

The above-mentioned additives may be mixed with the roe by an arbitrary method without restriction. For example, the mixing may be carried out by tumbling the salting container end-over-end, rotating the salting container or stirring the contents with blades. In the present invention, the roe and additives thus mixed together are then salted under the vibration conditions as will be specified below. It is also possible to effect the mixing by vibrating.

The term "vibration" as used in the processing method according to the present invention means a momentum change with time wherein the magnitude of the movement of an object alternates between a larger value and a smaller value based on a standard level.

As a device for generating the vibration, it is preferable to use a mechanical device such as a vibration motor or a piston, though sonic wave, underwater wave, bubbling or water-flow may be usable therefor. The method for generating the vibration is not particularly restricted, so long as the vibration conditions as will be specified below can be achieved thereby. Vibration may be fully propagated to the roe by, for example, locating the salting container at a place where the vibration is generated, vibrating the salting container per se or inserting a vibrator into the salting container, though the present invention is not restricted to these methods, so long as the vibration is fully propagated. The magnitude of the vibration is defined in various ways. In general, it can be expressed in three physical qualities, namely, displacement, velocity and acceleration.

In the present invention, the vibration conditions preferably involve a displacement of from 0.01 to 500 mm, an acceleration of from 0.01 to 20 G (G means the gravitational acceleration) and a velocity of from 1 to 1000 mm/sec. Two or more kinds of vibration may be combined together, so long as the vibration conditions fall within the above-mentioned ranges. When the magnitude of the vibration is smaller than the values as specified above, the vibration cannot exert any effect.

On the other hand, a magnitude of the vibration exceeding these values is not preferable, since the roe suffer from deformation or damage in this case.

Although the temperature in the vibration step is not particularly restricted, it is preferable that the temperature of the roe ranges from 0° to 35° C., still preferably from 5° to 25° C. in this step. A temperature lower than 0° C. is not preferable, since the roe is sometimes frozen in this case. On the other hand, a temperature exceeding 35° C. is not preferable from the viewpoint of sanitation, since bacteria would be liable to grow in this case.

The vibration time may preferably range from 2 to 48 hours, still preferably from 6 to 24 hours depending on the conditions of the roe. When the vibration time is shorter than 2 hours, salting cannot be fully effected. When it exceeds 48 hours, on the other hand, the roe granules are broken or bacteria grow, thus deteriorating the qualities of the product. Although it is preferable to apply continuous vibration, intermittent vibration can give satisfactory effects as well.

In the processing method according to the present invention of the above-mentioned constitution, the additives such as salt, seasonings and colorants migrate to the center of roe by salting the roe while vibrating said roe. Following the step of salting, the roe may be processed by a conventional method. Namely, the roe is washed with water, drained, dressed in shape, packed in a box and then frozen. We have further found out that the salt content and water content of the roe can be adjusted respectively to the level of 2.5% or more and 59% or more by effecting these processing steps. As the results of our examination, it has been found out that all of the salted Alaska pollack roe products judged as being excellent in qualities have a salt content of 2.5% or more and a water content of 59% or more, whereas those having a salt content and a water content lower than these levels are judged as being poor in qualities. Reasons for the latter judgment include a hard texture of the center of the ovary like mochi (rice cake) and the lack to granularity, caused by the indefinite shape of the roe granules, and salty taste.

The salt content suitable for salted Alaska pollack roe is 2.5% or more, preferably 4.0% or more, while the water content suitable therefor is 59% or more, preferably 63% or more.

Similarly, a water content of 59% or more and a salt content of 2.5% or more are necessary, when the roe is to be used as a feedstock material for producing karashimentaiko.

In the uniform processing of Alaska pollack roe, the relationship between the data of salt content and water content and the qualities has been clarified herein for the first time.

To further illustrate the method for processing Alaska pollack roe according to the present invention in greater detail, and not by way of limitation, the following Examples will be given.

[EXAMPLE 1]

20 kg of Alaska pollack roe (collected from fish 40 hours after fishing, an ovary weighing 80 to 150 g, suffering from no flaw on the surface and having a nearly uniform color) was put in a cylindrical container (30 l in capacity) and additives were added under the conditions as specified in Table 1. After mixing for 2 hours, salting was effected at a room temperature of 15° C. for 14 hours under vibration.

The vibration conditions involved a displacement of 0.2 mm, an acceleration of 1.1 G (gravitational acceleration) and a velocity of 170 mm/sec. After the completion of the salting, the roe was washed, drained, dressed in shape, packed in a box and frozen in accordance with a conventional method. After being stored in a frozen state for 6 months, it was thawed at 10° C.

The vibration factors are the average values of data obtained by measuring at several points around the salting container.

TABLE 1

| Composition of salted Alaska pollack roe | |
| --- | --- |
| Material and additive | Weight |
| roe | 20 kg |
| common salt | 1.6 kg |
| sodium glutamate | 100 g |
| sodium malate | 100 g |
| sodium ascorbate | 30 g |
| lipotide | 5 g |
| nitrous acid | 0.15 g |
| water | 6 kg |

The salted Alaska pollack roe thus obtained was subjected to a sensory test and the determination of the salt content and water content. Table 2 shows the results. A control product was obtained by salting the roe with the use of a rotary cask in a conventional manner.

[Evaluation items of sensory test on ovary]
(1) Hardness of salted Alaska pollack roe
  5: very hard,
  4: somewhat hard,
  3: comparable to the control,
  2: somewhat soft,
  1: soft.
(2) Granularity
  5: distinct,
  4: somewhat distinct,
  3: comparable to the control,
  2: somewhat poor,
  1: poor.
(3) State of binding of granules to membrane
  5: many liberated granules,
  4: somewhat many liberated granules.
  3: comparable to the control,
  2: somewhat less liberated granules,
  1: few liberated granules.
(4) Salt content
  0.5 to 1 g of roe granules were collected from the center of the ovary or therearound and homogenized by adding 9 times as much distilled water. After filtering, the salt content of the filtrate was measured with a simplified salt meter (manufactured by Horiba).
(5) Water content
  Roe granules were collected from the center of the ovary or therearound and the water content was determined by the atmospheric heat drying method (105° C., 24 hours).

TABLE 2

| Evaluation | Control | Example 1 |
| --- | --- | --- |
| hardness of salted roe | 3 | 3 |
| granularity | 3 | 4 |
| state of binding of granules to membrane | 3 | 3 |
| common salt concentration | | |
| periphery of ovary | 5.5 | 5.8 |
| center of ovary | 2.8 | 5.1 |
| water content | | |
| periphery of ovary | 65.0 | 65.8 |

TABLE 2-continued

| Evaluation | Control | Example 1 |
| --- | --- | --- |
| center of ovary | 56.4 | 64.5 |
| texture of center | just like mochi | granular |

[EXAMPLE 2]

The same feedstock material and the same additives, each as those employed in Example 1, were put in a container and well mixed together. Then the container was vibrated (displacement: 0.08 mm, acceleration: 0.3 G, velocity: 20 mm/sec) and further placed on a vibrating plate (displacement: 30 mm, acceleration: 0.1 G, velocity: 40 mm/sec). After being vibrated for 9 hours, the roe was washed, drained, dressed in shape, packed in a box and frozen in accordance with a conventional method. After being stored in a frozen state for 3 months, the product was thawed at room temperature and its qualities were evaluated. Table 4 shows the results. Part of the product was subjected to the examination on qualities without freezing (unfrozen sample). Table 3 shows the results. As a control, the same product as the one used in Example 1 as the control was employed.

TABLE 3

| Evaluation | Control (unfrozen) | Example 2 (unfrozen) |
| --- | --- | --- |
| hardness of salted roe | 3 | 3 |
| granularity | 3 | 4 |
| state of binding of granules to membrane | 3 | 3 |
| common salt concentration | | |
| periphery of ovary | 6.3 | 5.9 |
| center of ovary | 1.7 | 4.8 |
| water content | | |
| periphery of ovary | 65.5 | 66.1 |
| center of ovary | 53.2 | 65.5 |
| texture of center | just like mochi | granular |

TABLE 4

| Evaluation | Control (frozen) | Example 2 (frozen) |
| --- | --- | --- |
| hardness of salted roe | 3 | 3 |
| granularity | 3 | 4 |
| state of binding of granules to membrane | 3 | 3 |
| common salt concentration | | |
| periphery of ovary | 6.1 | 6.2 |
| center of ovary | 2.4 | 5.3 |
| water content | | |
| periphery of ovary | 65.0 | 65.9 |
| center of ovary | 55.1 | 64.4 |
| texture of center | just like mochi | granular |

[EXAMPLE 3]

20 kg of Alaska pollack roe (collected from fish 30 hours after fishing, an ovary weighing 100 to 150 g, suffering from no flaw on the surface and having a nearly uniform color) was put in a square plastics container (50 l in capacity) and additives as specified in Table 5 were added and mixed well. The mixture thus obtained was vibrated for 7 hours under the vibration conditions involving a displacement of 40 mm, an acceleration of 0.9 G and a velocity of 100 mm/sec. Sequentially, the roe was washed, drained, dressed in shape, packed in a box and frozen. After being stored in a frozen state for 3 months, the product was thawed at room temperature and its qualities were evaluated. Table 7 shows the results. Part of the product was subjected to the examination on qualities without freezing (unfrozen sample). Table 6 shows the results. A control product was obtained by salting the roe with the use of a rotary cask in a conventional manner.

TABLE 5

| Composition of salted Alaska pollack roe | |
|---|---|
| Material and additive | Weight |
| roe | 20 kg |
| common salt | 2.0 kg |
| sodium glutamate | 100 g |
| sodium malate | 200 g |
| sodium ascorbate | 40 g |
| lipotide | 2 g |
| nitrous acid | 0.13 g |
| water | 10 kg |

TABLE 6

| Evaluation | Control (unfrozen) | Example 3 (unfrozen) |
|---|---|---|
| hardness of salted roe | 3 | 3 |
| granularity | 2 | 4 |
| state of binding of granules to membrane | 2 | 3 |
| common salt concentration | | |
| periphery of ovary | 5.1 | 4.9 |
| center of ovary | 0.3 | 4.2 |
| water content | | |
| periphery of ovary | 60.2 | 64.5 |
| center of ovary | 58.2 | 63.5 |
| texture of center | just like mochi | granular |

TABLE 7

| Evaluation | Control (frozen) | Example 3 (frozen) |
|---|---|---|
| hardness of salted roe | 3 | 3 |
| granularity | 2 | 4 |
| state of binding of granules to membrane | 2 | 3 |
| common salt concentration | | |
| periphery of ovary | 4.9 | 4.7 |
| center of ovary | 1.3 | 4.5 |
| water content | | |
| periphery of ovary | 59.7 | 63.7 |
| center of ovary | 56.2 | 61.2 |
| texture of center | just like mochi | granular |

[Example 4]

20 kg of Alaska pollack roe (collected from fish 27 hours after fishing, an ovary weighing 100 to 150 g, suffering from no flaw on the surface and having a nearly uniform color) was put in a square plastics container (40 l in capacity) and additives as specified in Table 8 were added and mixed well. The mixture thus obtained was vibrated for 19 hours under the vibration conditions involving a displacement of 0.07 mm, an acceleration of 0.6 G and a velocity of 200 mm/sec. Sequentially, the roe was washed, drained, dressed in shape, packed in a box and frozen. During salting, the roe was subjected to the quiet stirring five times every two hours.

After being stored in a frozen state for 3 months, the product was thawed at room temperature and its qualities were evaluated. Table 9 shows the results. The vibration was loaded as sound vibration by a sound speaker attached to the bottom of the container. The vibration was measured for two minutes at each point of the container. The average value of the obtained values was made as the vibration value. A control product was obtained by salting the roe with the use of a rotary cask in a conventional manner.

TABLE 8

| Composition of salted Alaska pollack roe | |
|---|---|
| Material and additive | Weight |
| roe | 20 kg |
| common salt | 2.0 kg |
| sodium glutamate | 100 g |
| sodium malate | 100 g |
| sodium ascorbate | 40 g |
| lipotide | 2 g |
| nitrous acid | 0.13 g |
| water | 8 kg |

TABLE 9

| Evaluation | Control (frozen) | Example 4 (frozen) |
|---|---|---|
| hardness of salted roe | 3 | 3 |
| granularity | 3 | 4 |
| state of binding of granules to membrane | 3 | 3 |
| common salt concentration | | |
| periphery of ovary | 5.1 | 5.4 |
| center of ovary | 2.3 | 5.2 |
| water content | | |
| periphery of ovary | 62.2 | 62.5 |
| center of ovary | 58.2 | 61.5 |
| texture of center | just like mochi | granular |

Example 4 was carried out with the use of a salting and maturing container as shown in FIG. 1. The container shown in FIG. 1 will be explained with the reference to FIG. 2.

Figure 2:
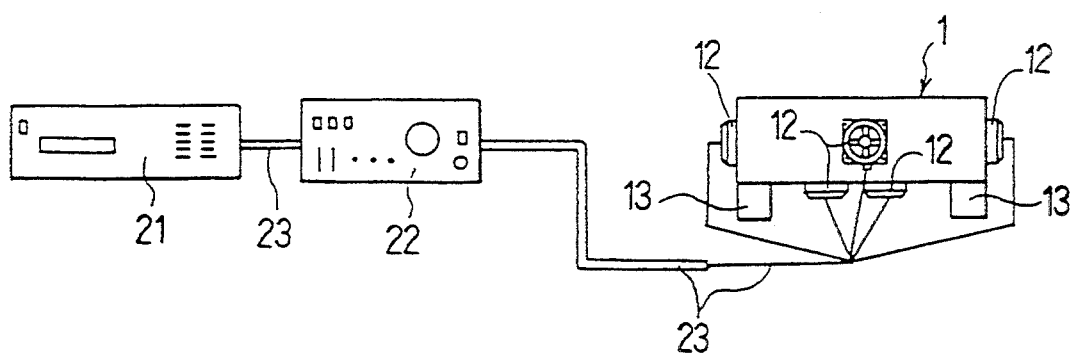
FIG. 2 is a view of directions for use of the salting and maturing container of the roe used in the present invention.

FIG. 1 (a) is a perspective view showing one example of the salting and maturing container of the roe used in the present invention, FIG. 1 (b) is its plan view, FIG. 1 (c) is its side view and FIG. 1 (d) is its bottom view. FIG. 2 is a view of directions for use of the salting and maturing container of the roe used in the present invention.

In FIG. 1, a salting and maturing container 1 of this example consists of a container 11 being rectangular in its outer shape, electricity-machinery vibration transfer 12 disposed on its each side and its bottom and legs 13. The container 11 is made of polypropylene and all of its upper part is open. One electricity-machinery vibration transfer 12 is disposed in the middle part of the each side of the container 11, and two electricity-machinery vibration transfers 12 are disposed at the bottom. The leg 13 is disposed at four corners of the bottom of the container 11.

Inside the electricity-machinery vibration transfer 12 a permanent magnet and a coil are disposed (not shown in Fig.). The vibration is generated by the magnetic interferential action of the magnetic force generated from the coil and the magnetic force of the permanent magnet thereby vibrating the salting and maturing container 1. Thus salt or seasoning ingredients can be penetrated even into the center of roe, and penetration nonuniformity does not occur. Further the legs 13 are to convey the vibration to the inside of the container 11 effectively in such a manner that the container 11 is suspended in the air. Thus the vibration can be conveyed effectively to the inside of the container 11.

Now the salting and maturing of roe using the salting and maturing container 1 will be explained with reference to FIG. 2. In FIG. 2, each electricity-machinery vibration transfer 12 is connected with a CD (compact disk) deck 21 generating sound signal and an amplifier 22 amplifying the sound signal through codes 23. Inside the container 11, aqueous solution in which salt and seasoning are dissolved and roe material were placed (not shown in Fig.). When the salting and maturing container 1 is used, first in the status shown in FIG. 2, the electric current is let flow into the CD deck 21 and the amplifier 22, the sound signal is put out from the CD deck 21 and the sound signal is amplified through the amplifier 22. The sound signal thus amplified is conveyed to each electricity-machinery transfer 12 through the code 23 thereby generating the vibration from each electricity-machinery transfer 12. The vibration thus generated is conveyed over the whole container 11 so that the roe is salted and matured.

The method for processing Alaska pollack roe according to the present invention enables salt, seasonings and colorants used in the salting step to uniformly migrate into the center of the roe without much depending on the states of the roe employed as the feedstock material, thus giving Alaska pollack roe products with uniform qualities.

What is claimed is:

1. A method for processing Alaska pollack roe which comprises salting the Alaska pollack roe while vibrating said roe at a displacement of from 0.01 to 500 mm, at an acceleration of from 0.01 to 20 G (gravitational acceleration) and at a velocity of from 1 to 1000 mm/sec., said vibrating resulting in a momentum change with time whereby movement of said roe during said vibrating alternates between a larger value and a smaller value based on a standard level.

2. A method for processing Alaska pollack roe as claimed in claim 1, wherein the salt content of the salted Alaska pollack roe is 2.5% or more and the water content thereof is 59% or more.

* * * * *